United States Patent
Brinkmeier

(10) Patent No.: US 10,971,740 B2
(45) Date of Patent: Apr. 6, 2021

(54) HUMIDIFIER, PLATE, DEVICE, AND MOTOR VEHICLE

(71) Applicant: Volkswagen AG, Wolfsburg (DE)

(72) Inventor: Jan-Philipp Brinkmeier, Braunschweig (DE)

(73) Assignee: Audi AG, Ingoistadt (DE)

( * ) Notice: Subject to any disclaimer, the term of this patent is extended or adjusted under 35 U.S.C. 154(b) by 671 days.

(21) Appl. No.: 15/315,607

(22) PCT Filed: May 27, 2015

(86) PCT No.: PCT/EP2015/061666
§ 371 (c)(1),
(2) Date: Dec. 1, 2016

(87) PCT Pub. No.: WO2015/185403
PCT Pub. Date: Dec. 10, 2015

(65) Prior Publication Data
US 2017/0222235 A1 Aug. 3, 2017

(30) Foreign Application Priority Data

Jun. 2, 2014 (DE) .................... DE102014210370.3

(51) Int. Cl.
*H01M 8/04* (2016.01)
*H01M 8/04119* (2016.01)
(Continued)

(52) U.S. Cl.
CPC ........ *H01M 8/04141* (2013.01); *B01D 63/06* (2013.01); *H01M 8/04149* (2013.01);
(Continued)

(58) Field of Classification Search
CPC ........ H01M 8/04141; H01M 8/04149; H01M 8/04126; H01M 2250/20; B01D 63/06;
(Continued)

(56) References Cited

U.S. PATENT DOCUMENTS 6,471,195 B2  10/2002 Shimanuki et al.
6,551,736 B1 * 4/2003 Gurau ................. H01M 8/0263
                                                    429/480
(Continued)

FOREIGN PATENT DOCUMENTS

CN       2544418 Y      4/2003
CN     102798186       11/2012
(Continued)

OTHER PUBLICATIONS

Translation of JP2007324031 (Year: 2007).*
(Continued)

*Primary Examiner* — Stephen Hobson
(74) *Attorney, Agent, or Firm* — Davidson, Davidson & Kappel, LLC

(57) ABSTRACT

A humidifier, a device including a fuel cell, and a motor vehicle. The humidifier of the includes at least one humidifying duct and is designed in such a way that a first gas to be humidified can be conducted in the humidifying duct in a direction of flow and, separated by a water-permeable material, past a humidifying second gas so that water is transferred from the second gas to the first gas. The humidifier includes a cross-sectional area of the humidifying duct available to the first gas tapers in the direction of flow. The fact that the cross-sectional area tapers results in a drop in pressure along the humidifying duct, and the drop in pressure reduces, compensates or overcompensates an increase in pressure resulting from the increasing humidification, so the partial difference in pressure between the first gas and the second gas remains large over the distance of the humidifying duct in spite of the transfer of humidity.

14 Claims, 3 Drawing Sheets

(51) Int. Cl.
*B01D 63/06* (2006.01)
*B01D 53/22* (2006.01)
*B01D 53/26* (2006.01)

(52) U.S. Cl.
CPC .......... *B01D 53/268* (2013.01); *B01D 63/066* (2013.01); *B01D 2053/222* (2013.01); *B01D 2053/224* (2013.01); *B01D 2313/20* (2013.01); *B01D 2325/06* (2013.01); *H01M 8/04126* (2013.01); *H01M 2250/20* (2013.01); *Y02T 90/40* (2013.01)

(58) Field of Classification Search
CPC ............ B01D 63/066; B01D 2053/224; B01D 2053/222; B01D 53/268; B01D 2313/20; B01D 2325/06; Y02E 60/50
See application file for complete search history.

(56) References Cited

U.S. PATENT DOCUMENTS

| | | | | |
|---|---|---|---|---|
| 6,554,261 | B2* | 4/2003 | Katagiri | H01M 8/04119 261/154 |
| 8,058,352 | B2* | 11/2011 | MacKinnon | H01M 8/103 525/326.2 |
| 8,104,748 | B2* | 1/2012 | Leister | B01D 63/02 261/97 |
| 8,317,167 | B2* | 11/2012 | Kim | B01F 3/04085 261/104 |
| 9,070,913 | B2* | 6/2015 | Kim | H01M 8/04149 |
| 2001/0009306 | A1* | 7/2001 | Shimanuki | H01M 8/04119 261/104 |
| 2004/0247986 | A1 | 12/2004 | Takeguchi et al. | |
| 2009/0000732 | A1* | 1/2009 | Jacobine | H01M 8/0267 156/273.5 |
| 2009/0239111 | A1* | 9/2009 | Zeng | H01M 8/04149 429/413 |
| 2010/0047643 | A1* | 2/2010 | Yukimasa | H01M 8/04776 429/432 |
| 2012/0181712 | A1* | 7/2012 | Vanderwees | H01M 8/04141 261/102 |
| 2013/0137003 | A1* | 5/2013 | Osada | H01M 8/04141 429/413 |
| 2015/0221963 | A1* | 8/2015 | Guzda | B01D 67/0034 261/107 |
| 2015/0325868 | A1* | 11/2015 | Fasold | F24F 3/14 429/413 |
| 2017/0084935 | A1* | 3/2017 | Desjardins | H01M 8/04141 |
| 2017/0346110 | A1* | 11/2017 | Vanderwees | H01M 8/04141 |
| 2018/0034079 | A1* | 2/2018 | Shibata | H01M 8/0202 |
| 2019/0288306 | A1* | 9/2019 | Becker | H01M 8/04149 |
| 2020/0001238 | A1* | 1/2020 | Bahar | B01D 61/362 |
| 2020/0153004 | A1* | 5/2020 | Oh | H01M 8/04149 |
| 2020/0161678 | A1* | 5/2020 | Bauer | H01M 8/04835 |
| 2020/0185738 | A1* | 6/2020 | Kim | H01M 8/04835 |

FOREIGN PATENT DOCUMENTS

| | | | |
|---|---|---|---|
| DE | 101 02 358 A1 | | 8/2001 |
| DE | 101 02 447 A1 | | 9/2001 |
| DE | 102 44 707 | * | 4/2004 |
| DE | 102 44 707 A1 | | 4/2004 |
| DE | 10 2008 006 793 A1 | | 8/2009 |
| DE | 102010035359 | | 5/2011 |
| JP | H0771795 | | 3/1995 |
| JP | 2002066271 | * | 3/2002 |
| JP | 2003346874 A | | 12/2003 |
| JP | 2007324031 | * | 12/2007 |
| JP | 2010-107126 | | 5/2010 |

OTHER PUBLICATIONS

EPO translation of Hitohide JP 2002066271 published Mar. 5, 2002 (Year: 2002).*
EPO translation of Schnetzler et al. DE 102 44 707 A1 published Apr. 1, 2004 (Year: 2004).*
Epo translation of JP 2007-324031 (Year: 2007).*
Kadylak, David Erwin, "Effectiveness method for heat and mass transfer in membrane humidifiers," Apr. 2009, University of British Columbia, Vancouver, Canada, 94 pages.
Yu et al.: "*A parametric study of the performance of a planar membrane humidifier with a heat a mass exchanger model for design optimization*", International Journal of Heat and Mass Transfer, vol. 54, Issues 7-8, pp. 1344-1351, Jan. 6, 2011.

* cited by examiner

HUMIDIFIER, PLATE, DEVICE, AND MOTOR VEHICLE

The present invention relates to a humidifier, a device which includes a fuel cell, and a motor vehicle.

BACKGROUND

Humidifiers are used to supply moisture to a gas to be humidified. Humidifiers are used in particular during operation of a device which includes at least one fuel cell. Fuel cells are used to directly convert chemical energy into electrical energy, and may be employed in stationary or mobile applications. One example of an application is in motor vehicles. Humidifiers are used to humidify supply air for the fuel cell, for example with the aid of exhaust gas of the fuel cell, which naturally has a high moisture level.

In principle, humidifiers are designed in such a way that on a humidification path, a gas to be humidified and a humidifying gas which are separated from one another by a water-permeable material may be passed by one another in such a way that water in the gaseous, liquid, or vapor phase is transferred from the second gas into the first gas.

Thus, for example, a humidifier is known from DE 101 02 447 A1 which is provided for use with a fuel cell. The humidifier includes multiple combined water-permeable membranes, each of the water-permeable membranes generating humidified gas, in that various gases having different moisture contents flow therein, and moisture exchange takes place between the various gases, so that a dry gas having a lower moisture content is humidified by the other, moist gas having a higher moisture content.

Another form of humidifier uses hollow fibers. DE 102 44 707 A1 describes a device for exchanging moisture, in particular water or water vapor, between a moist gas stream and a dry gas stream. Hollow fibers are used for separating the two gas streams from one another. In addition, DE 101 02 358 A1 describes a humidifier which includes a housing that accommodates a large number of water-permeable hollow fiber membranes situated in the longitudinal flow direction of the housing, two different gases having different moisture contents, separated by the space, being led outside and through the interior of the bundle of the hollow fiber membranes in order to exchange their moisture via the hollow fiber membranes, the dry gas having the lower moisture content being humidified.

While the housing mentioned in DE 102 44 707 A1 is cubic, JP H07-71795 relates to a humidifier in a cylindrical housing.

Kadylak, David Erwin, "Effectiveness method for heat and mass transfer in membrane humidifiers," April 2009, University of British Columbia, Vancouver, Canada, discusses the variables and parameters which influence the water transfer in humidifiers, and mentions in particular the dependency of the performance on the humidifier geometry and the flow conditions. It is stated that capillary water transfer through membrane pores is driven by large pressure differences.

To equalize the pressure loss of an air stream which penetrates into a free space between humidifier modules, DE 10 2008 006 793 A1 describes a design of the humidifier module with two mutually inclined inflow surfaces.

SUMMARY OF THE INVENTION

The object of the present invention is to improve the transfer of moisture from moist gas to gas to be humidified.

A humidifier provided for this purpose. Moreover, a plate, and a device-which includes a fuel cell, and a humidifier for humidifying supply air for the fuel cell with the aid of exhaust gas of the fuel cell are provided. A motor vehicle which includes the device according to the present invention is also provided.

The humidifier provided according to the present invention includes at least one humidification channel, the humidifier being designed in such a way that in the humidification channel, a first gas to be humidified may be led in a flow direction, and, separated by a water-permeable material, past a humidifying second gas so that water is transferred from the second gas into the first gas. The humidifier provided according to the present invention is characterized in that a cross-sectional area of the humidification channel available to the first gas decreases in the flow direction.

The tapering of the cross-sectional area effectuates a pressure drop across the humidification channel which reduces, compensates for, or overcompensates for a pressure rise due to the increasing humidification, so that the partial pressure difference between the first gas and the second gas remains large across the humidification channel path despite the transfer of moisture.

In one advantageous specific embodiment, the humidifier may include a housing via which the humidification channel is delimited. The humidifier may include a plurality of hollow fibers, made of the water-permeable material, for passing the second gas through, the hollow fibers in the housing extending perpendicularly with respect to the flow direction, the packing density of the hollow fibers being constant in the flow direction, and the housing tapering in the flow direction.

The plate provided according to the present invention, which is made of water-permeable material, has webs on a flat side which extend in a flow direction and delimit a humidification channel. The plate is characterized in that a distance between the webs decreases monotonically in the flow direction.

The advantage of the plate is likewise based on the fact that the partial pressure difference between the first gas and the second gas remains large across the humidification channel path despite the transfer of moisture.

In one advantageous specific embodiment, the plate may include a plurality of webs which delimit a plurality of mutually parallel humidification channels, widths of the webs monotonically increasing in the flow direction, so that cross-sectional areas of the humidification channels decrease in the flow direction.

It is also possible for the plate to have further webs which extend in the flow direction on the other flat side, distances between the further webs monotonically increasing in the flow direction.

In another specific embodiment, the humidifier may include at least one plate according to the present invention in a housing.

Unless stated otherwise in the individual case, the various specific embodiments of the present invention, mentioned in this patent application, are advantageously combinable with one another.

BRIEF DESCRIPTION OF THE DRAWINGS

The present invention is explained below in exemplary embodiments with reference to the appended drawings.

DETAILED DESCRIPTION

Figure 1:
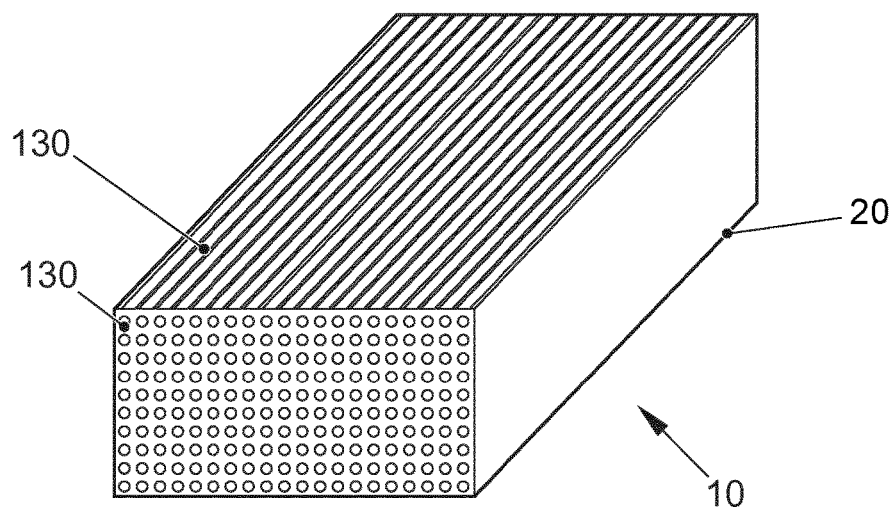
FIG. 1 shows a first humidifier according to the prior art.

First humidifier 10 according to the prior art shown in FIG. 1 includes a housing 20 in which a hollow fiber bundle containing parallel hollow fibers 130 is situated. The density of hollow fibers 130 in the bundle is constant.

Housing 20 shown is cylindrical with a rectangular base surface, and delimits a humidification channel which extends in a flow direction in parallel to the base surfaces. In humidifier 10 shown, hollow fibers 130 extend perpendicularly with respect to the base walls, and thus perpendicularly with respect to the flow direction and in parallel to the side walls of the housing. Two of the side walls, which do not adjoin one another and which are thus in parallel to one another in the example, include a first gas inlet and a first gas outlet through which a first gas may be led into housing 20 and out of the housing, respectively.

The second gas may be led from a second gas inlet to a second gas outlet. In the illustrated example, the ends of the hollow fibers form the second gas inlet and the second gas outlet.

Hollow fibers 130 are arranged in housing 20 with a uniform density. Hollow fibers 130 are made of water-permeable material, and allow the capillary passage of moisture, but not gas, through pores in the material. This allows moist gas, for example, to be led through hollow fibers 130, and gas to be humidified to be led around hollow fibers 130. Alternatively, gas to be humidified is led through hollow fibers 130, and moist gas is led around hollow fibers 130.

Figure 2:
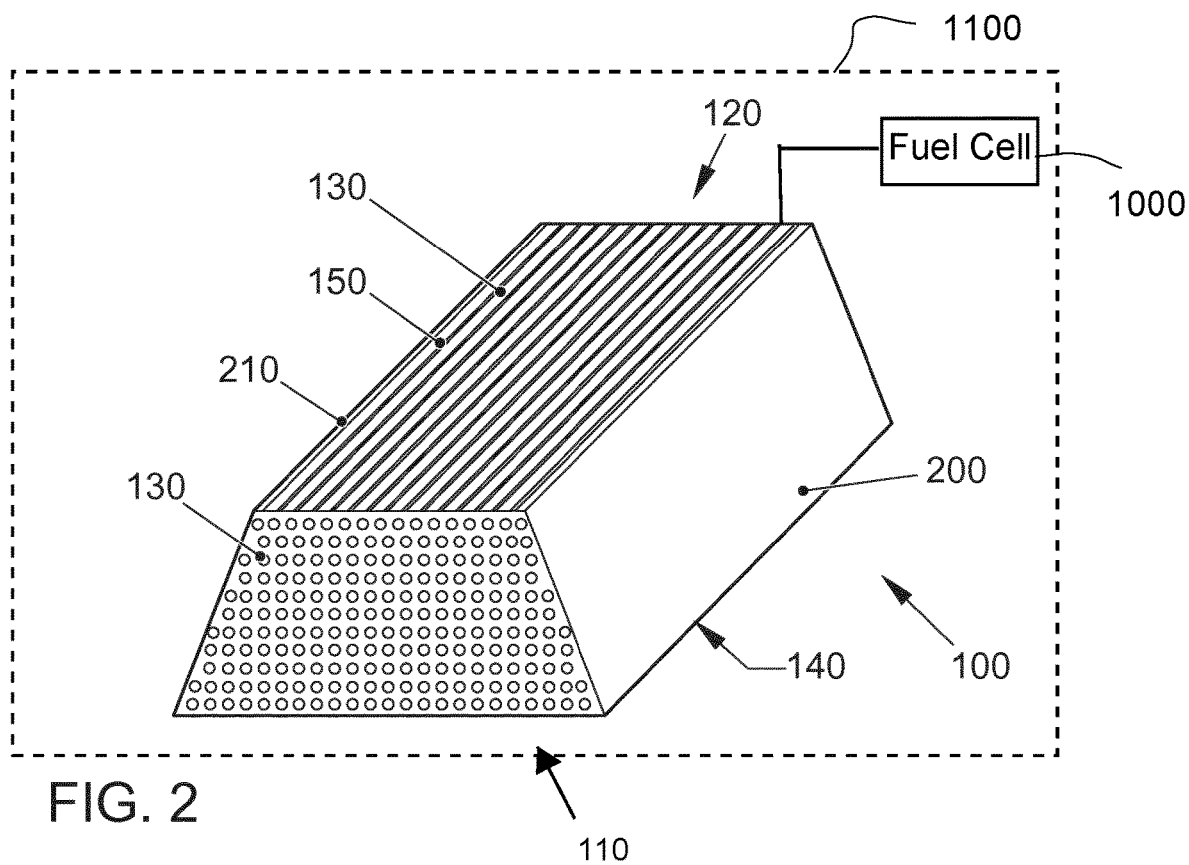
FIG. 2 shows a second humidifier which represents one exemplary embodiment of the present invention.

FIG. 2 shows a second humidifier 100 with a housing 200, which represents one exemplary embodiment of the present invention, for a fuel cell 1000 in a vehicle 1100, shown schematically. Shown housing 200 of second humidifier 100 includes humidification channel 210, and is cylindrical. A hollow fiber bundle containing parallel hollow fibers 130 is situated in housing 200. A density of hollow fibers 130 in the bundle is constant. In the exemplary embodiment of humidifier 100 according to the present invention, base walls 110, 120 of the housing are trapezoidal. Once again, hollow fibers 130 extend perpendicularly with respect to the base walls, and thus in parallel to the side walls of housing 200, which in addition to mutually parallel base walls 110, 120 includes a pair of parallel side walls 140, 150 and a pair of nonparallel side walls. The pair of parallel side walls 140, 150 includes the first gas inlet and the first gas outlet, through which a first gas may be led into housing 200 and out of housing 200, respectively. The flow direction from the first gas inlet to the first gas outlet is perpendicular to the direction of extension of hollow fibers 130. The area density of hollow fibers 130 in housing 100 is constant in each plane perpendicular to the flow direction, in which the first gas to be humidified is led. A first gas inlet, through which the first gas is led into the humidification channel, is included by larger parallel side wall 140, and a first gas outlet, through which the first gas is led out of the humidification channel, is included by smaller parallel side wall 150. Therefore, a cross-sectional area of the humidification channel decreases in the flow direction.

Hollow fibers 130 are made of water-permeable material, and allow the capillary passage of moisture, but not gas, through pores in the material.

When first gas to be humidified in housing 200 now flows around hollow fibers 130 from the first gas inlet to the first gas outlet, and moist second gas flows through hollow fibers 130, the partial pressure difference of the moisture between the first gas and the second gas remains large, since the pressure reduction due to the change in cross-sectional area reduces, compensates for, or overcompensates for the increase in partial pressure of the moisture in the first gas on account of the transfer of moisture during flow around the hollow fibers. The remaining partial pressure difference effectuates uniformly good transfer of moisture from the second gas to the first gas.

Figure 3:
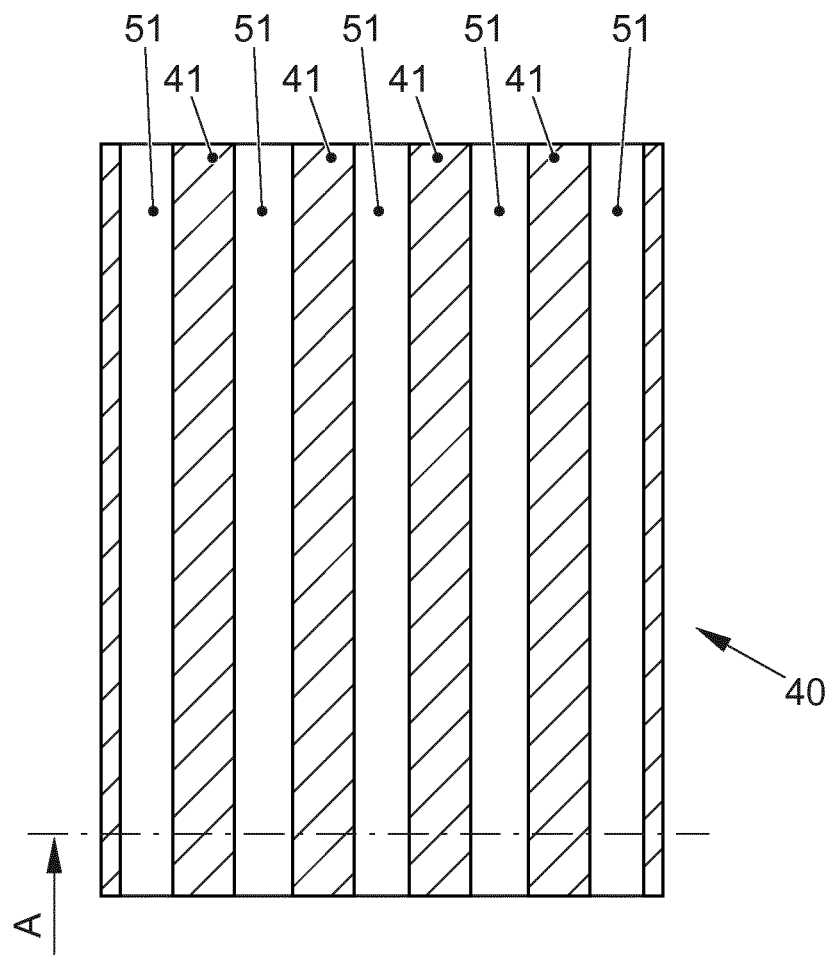
FIG. 3 shows a first plate according to the prior art made of water-permeable material, in a top view.
Figure 4:
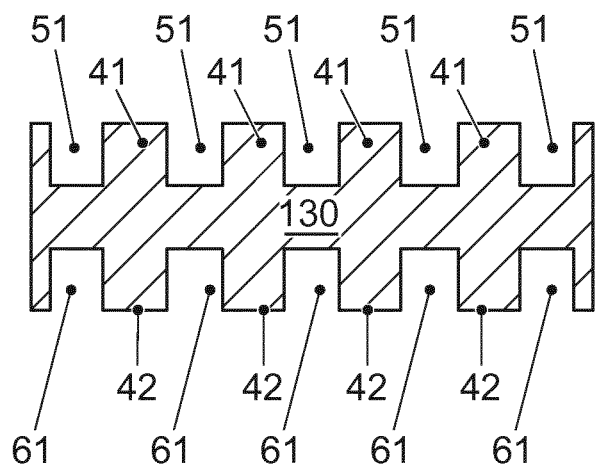
FIG. 4 shows the first plate in a sectional view.

FIG. 3 shows a first plate 40 according to the prior art made of water-permeable material, in a top view, and FIG. 4 shows first plate 40 in a sectional view along the line denoted by reference character A in FIG. 3. Such a plate 40 made of water-permeable material, which allows the capillary passage of moisture through pores in the material, is also referred to as a membrane humidifier plate.

Webs 41, 42 which protrude at the same height and extend in parallel to one another, forming open channels 51, 61, are formed on the flat sides of plate 40. Each of webs 41, 42 has a constant width and each of channels 51, 61 has a constant width, whereby different webs 41, 42 and/or channels 51, 61 may have different widths. When channels 51, 61 are closed off by situating plate 40 in a housing, the first gas to be humidified may be led through channels 51 on one of the flat sides of plate 40, and the humidifying second gas may be led in counterflow through channels 61 on the other flat side of plate 40. Due to the partial pressure difference of the water between the first gas and the second gas, moisture diffuses through the plate and humidifies the first gas.

Figure 5:
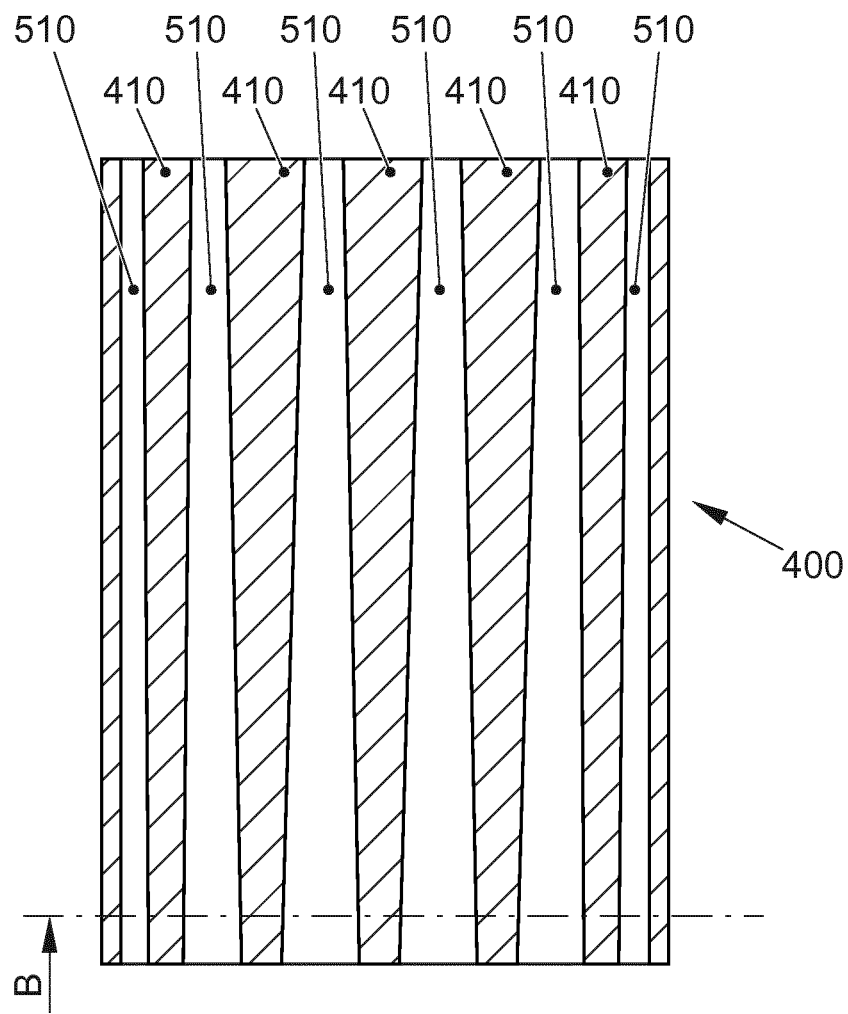
FIG. 5 shows a second plate made of water-permeable material in a top view, the second plate representing one exemplary embodiment of the present invention.
Figure 6:
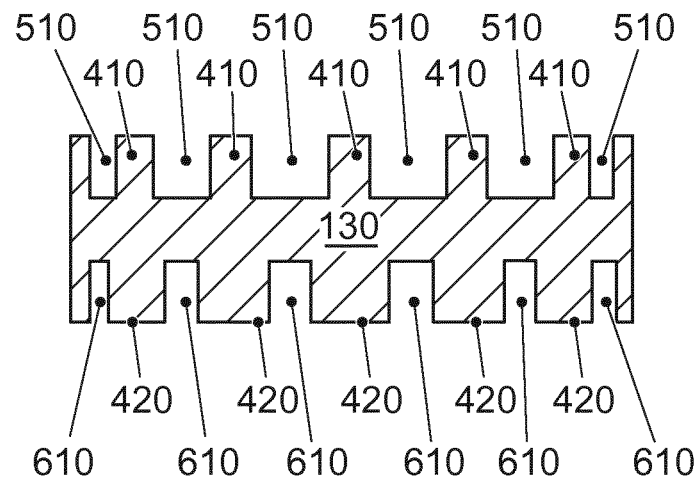
FIG. 6 shows the second plate according to the present invention in a sectional view.

FIG. 5 shows a second plate 400 made of water-permeable material which allows the capillary passage of moisture through pores in the material, in a top view, and FIG. 6 shows second plate 400 in a sectional view along the line denoted by reference character B in FIG. 5. Plate 400 illustrated in FIGS. 5 and 6 represents one exemplary embodiment of the present invention.

Once again, webs 410, 420 which protrude at the same height, forming open channels 510, 610, are formed on the flat sides of plate 400. Although channels 510, 610 extend essentially in parallel, the side walls of channels 510, 610 do not, since the width of channels 510, 610 changes linearly over the length of plate 500. This is achieved by webs 510, 610 410, 420 which become wider linearly over the length of plate 500.

Webs 410 taper on the one flat side of plate 100, in the opposite direction from webs 420 on the other flat side. However, it is also possible for webs 410 on the one flat side of plate 100 to taper in the same direction as webs 420 on the other flat side.

It is also possible for each web 410, 420 between two channels 510, 610 to be replaced by two nonparallel auxiliary webs, between which a free space remains which is not utilized as a channel.

Plate 400 is made of water-permeable material, and allows the capillary passage of moisture, but not gas, through pores in the material.

When the channels are closed off due to situating plate 400 in a housing, the first gas to be humidified may be led through channels 510 on one of the flat sides of the plate, and the humidifying second gas may be led in counterflow through channels 610 on the other flat side of the plate. Due to the partial pressure difference of the water between the first gas and the second gas, moisture diffuses through the plate and humidifies the first gas. In the process, the partial pressure difference over the entire distance remains large enough for an effective transfer of moisture, and good humidification of the first gas and/or dehumidification of the second gas.

In the exemplary embodiments illustrated and described, the width or cross-sectional area of the channel(s) for the passage of the gas to be humidified changes linearly. However, other changes in width are possible within the meaning of the present invention. The effect according to the present invention is based on the reduction in the channel width or the channel cross section in the flow direction. For the effect according to the present invention, it is sufficient if a channel width or a channel cross section on an inlet side, on which the gas to be humidified is supplied to the channel, is larger than on an outlet side, on which the humidified gas is discharged from the channel.

LIST OF REFERENCE NUMERALS 10, 100 humidifier
20, 200 housing
210 humidification channel
110, 120 base walls
130 water-permeable material, designed as a hollow fiber or as a plate with webs
140, 150 parallel side walls of the housing
40, 400 plate
41, 42 webs of constant width
410, 420 webs with variable width
51, 61 channels of constant width
510, 610 channels with variable width

The invention claimed is:

1. A plate made of water-permeable material, the plate comprising:
    webs on a flat side extending in a flow direction and delimiting a humidification channel, a distance between the webs decreasing monotonically in the flow direction; wherein a plurality of the webs delimit the humidification channel and at least one further mutually parallel humidification channel, widths of the webs monotonically increasing in the flow direction, so that cross-sectional areas of the humidification channel and the at least one further humidification channel decrease in the flow direction.

2. The plate as recited in claim 1 wherein the plate includes further webs extending in the flow direction on an other flat side.

3. The plate as recited in claim 2 wherein widths of the further webs on the other flat side increase monotonically in the flow direction.

4. The plate as recited in claim 2 wherein the side and the other flat side define parallel planar surfaces.

5. The plate as recited in claim 1 wherein the plate has an other flat side opposite the flat side, the side and further flat side defining parallel planar surfaces.

6. The plate as recited in claim 1 wherein the webs protrude perpendicularly from the flat side.

7. The plate as recited in claim 6 wherein the humidification channel is delimited by the webs and the flat side.

8. The plate as recited in claim 1 wherein a plurality of the webs delimit the humidification channel and at least one further mutually parallel humidification channel, the plurality of webs protruding perpendicularly from the flat side.

9. The plate as recited in claim 8 wherein the humidification channel and the at least one further mutually parallel humidification channel is delimited by the webs and the flat side.

10. The plate as recited in claim 1 wherein the water-permeable material allows capillary passage of moisture through pores in the material.

11. The plate as recited in claim 1 wherein the water-permeable material does not permit passage of gas.

12. A humidifier comprising:
    at least one plate as recited in claim 1, a first gas to be humidified in the humidification channel being leadable in a flow direction and, separated by a water-permeable material, past a humidifying second gas so that water is transferred from the second gas into the first gas, a cross-sectional area of the humidification channel available to the first gas decreasing in the flow direction.

13. A device comprising a fuel cell and a humidifier as recited in claim 12 for humidifying supply air for the fuel cell with the aid of exhaust gas of the fuel cell.

14. A motor vehicle comprising the device as recited in claim 13.

* * * * *